United States Patent Office

3,193,422
Patented July 6, 1965

3,193,422
SMOKE AGENTS
Johannes Buck, deceased, late of Bad Uberkingen, Germany, by Hedwig Buck, sole heiress, 21 Geislinger Strasse, Bad Uberkingen, Germany, and Ludwig Scheichl, 95 Romerstrasse, Duisdorf, near Bonn, Germany
No Drawing. Filed Feb. 19, 1962, Ser. No. 174,306
2 Claims. (Cl. 149—29)

The present invention relates to agents for the generation of artificial smoke, preferably for the generation of screening smoke for military purposes.

More particularly, the invention relates to mixtures generating dense smokes at relatively low temperatures by a process of thermal vaporization and containing as a smoke-generating component red phosphorus and at least one ammonium compound capable of being vaporized by heat.

Heretofore, the smoke agent mixtures employed to generate artificial smoke for military purposes were those generally known by the name of "Berger-type smoke agent mixtures," substantially composed of two parts of zinc dust and oxide of zinc to three parts of hexachlorethane.

These known mixtures, while yielding a dense artificial smoke, have nevertheless various disadvantages, the most important of which are that their storage is subject to certain limitations and that they have a tendency to spontaneous ignition in the presence of moisture. The reaction of these mixtures after their ignition takes place at temperatures which are so high that the metal containers in which they are employed become red hot thereby rendering smoke pot emplacements visible over great distances, particularly during darkness, and presenting moreover the risk of a forest or grass fire.

The principle of using phosphorus to generate smoke has been known in itself for quite some time. As compared to red phosphorus, white phosphorus has the advantage of yielding a very dense smoke; its disadvantage lies in its spontaneous inflammability at normal temperatures which makes storage and handling dangerous, or requires them to be effected under special conditions. Even though the above disadvantages are not present in red phosphorus, and although it has frequently been used in lieu of white phosphorus, there is still a disadvantage in that red phosphorus also burns with a bright flame and that any type of phosphorus smoke subsides relatively fast due to its pronounced hygroscopicity. Owing to the high percentage of red phosphorus used to-date in these mixtures and due to the use of solvents, such as acetone, and plasticizers, such as asphalt or plastic polymers, these mixtures are highly combustible and burn with a flame which is visible over great distances and at flame temperatures which are so high that they frequently cause fires in the immediate surroundings.

Accordingly, it is the object of the present invention to provide a smoke agent mixture which will be so composed that at least the same smoke generation properties are achieved as in the good quality smoke agent mixtures used heretofore, such as Berger-type mixtures, but in which the reaction takes place without the occurrence of sparks or flames and in which the component material will not tend to spontaneous ignition, even in the presence of moisture and which may thus be handled without hazard. Further properties and advantages of smoke agent mixtures according to the present invention will become apparent from the following description.

It has been found that the above object can be achieved by using a mixture composed of red phosphorus and an inorganic oxygen carrier which is selected from a group consisting of the nitrates and the salts of a per-acid, such as permanganates or peroxides, on the one hand, and an ammonium compound which is capable of being thermally vaporized by the burning of the red phosphorus, on the other hand. When such an intimate mixture is ignited, the heat generated by the burning of the red phosphorus with at least one of the above inorganic oxygen carriers serves to convert the ammonium compound, preferably a sublimable ammonium compound, such as chloride of ammonium, to smoke. A visible phosphorus flame is prevented from forming by reaction at relatively low temperatures. Due to the presence of ammonium compounds a sudden combustion of the phosphorus, accompanied by flames, cannot occur because the heat generated by the burning of the red phosphorus will just be sufficient to sustain the vaporization process which can be prolonged at will by adding new material. Since the mixture is not sensitive to moisture, it may be packed in inexpensive packing materials. There is no requirement for special storage conditions; this factor may be of importance for its use aboard ships, for example. The mixture according to the present invention requires special ignition and cannot even be ignited with a normal match; having become moist, it will dry out relatively fast by oxydation heat; water vapors which might be generated will even enhance the smoke effect. This is a particular advantage as compared to the Berger-type smoke agent mixtures which are known for their inflammability and sensitivity if their packings have sustained even relatively minor damage while in storage. The smoke generation process of Berger-type mixtures takes place at temperatures which are so high that sheet metal containers of smoke candles and smoke pots are brought up to red and even white heat, thereby presenting in many instances, such as military exercises, a hazard of forest and brush fires. The physiological effects caused by the presence of free chlorine in the generated smoke are an additional disadvantage.

A mixture according to the present invention will, however, smolder at relatively low temperatures and without the occurrence of any sparks or flames. The temperature of the reaction process is so low that even inexpensive cardboard containers of smoke candles sustained discolorations only, but did not start to burn. Tests did not show any detrimental physiological effects.

The following has proved to be a particularly advantageous composition of a mixture according to the present invention:

100 grs. of red phosphorus
600 grs. of chloride of ammonium
300 grs. of saltpeter Compositions of this type have the advantage of not tending to spontaneous ignition; their reaction can only be initiated by using means which generate predetermined ignition temperatures, such as ignitors, ignition tubes, and the like. As the temperature which can be generated with the help of a normal match, or a lighter, will not be sufficient for the purpose of igniting the mixture, its handling is relatively devoid of danger.

An advantage of smoke agents according to the present invention lies in the fact that the red color of the phosphorus will dye the other ingredients of the mixture; the uniform coloring of all the ingredients of the mixtures, such as for instance those which were white originally, will thus indicate that mixing has resulted in a uniform distribution. A preferred method of work would be to mix first the ingredients to be admixed to the red phosphorus with each other; in the above-mentioned example these would be chloride of ammonium and nitrate of potassium; and having produced an intimate mixture of these two ingredients to admix the red phosphorus, continuing the mixing process until the whole mixture is uniformly colored. Bonding properties may then be imparted to the material by the addition of a suitable binding agent of a known type, such as methyl cellulose, vegetable jelly of pectinic acid, or naphthalene, whereupon the material may be formed as desired, for instance by compression molding to form shape retaining bodies such as cubes, lumps, or pellets. However, it is desirable that such cubes, lumps or pellets be friable, as for instance by crushing or pulverizing by hand. Binding agents employed should either be carbonizable at low temperature or should be of a type which will not exercise any adverse influences at the temperatures at which the smoke agent will burn; these binding agents should be such that they will not impair the generation of smoke by deflagration or flames.

The smoke agents to which the present invention relates may also be colored by the addition of suitable materials of a known type to generate colored smoke. Sublimable materials with a coloring effect, such as iodine, with the help of which the desired degree of coloring may be obtained, are suitable materials for this purpose.

The smoke generating agent of the invention is very easy to employ as it may simply be spread on natural soil; the number of emplacements where smoke is generated can be increased at will. Owing to the properties previously mentioned it is also possible during the smoke generation process to replenish the smoke pots without danger, thus continuing the process for any desired length of time or increasing its intensity as desired.

It has furthermore been found that both density and coloring of a smoke obtained from a smoke agent in accordance with the present invention can be improved by the addition of small quantities of water-insoluble, unsaponifiable and preferably oily hydrocarbons, preferably mineral oils or substances containing mineral oils whose boiling point is not below about 200° C. and not above about 380° C. Accordingly, the materials which may be used are paraffins, cyclo-paraffinic hydrocarbons, olefines, and the like; mineral oils which may be used are those which correspond to diesel fuel and of which refuse and residues may be used. The amount to be added, in particular of mineral oils, is about 4 to 12 percent by weight of the total amount of the mixture; preferably about 7 to 9 percent by weight. The suitability of additives which may be used and the amount to be added can easily be ascertained in preliminary tests. Oxygen carriers which are particularly suited for the above-mentioned mixtures are nitrates, particularly nitrate of potassium or barium nitrate; the amount of oxygen carrier to be added should be such that the oxygen made available for the reaction is sufficient to prevent residues of phosphorus from being left as such residues would be in the form of white phosphorus and would make handling hazardous. If the surplus of oxygen formed is adjusted in such a way that it is in excess of the quantity required for complete oxydation of the phosphorus by at least 15 percent, but by not more than 25 percent, there will be no danger of residues of phosphorus being left at the termination of the carbonizing process.

Since a certain percentage of the oxygen required for complete oxydation of the phosphorus will be contributed by the surrounding atmosphere it will be advisable to adhere to the lower limit of about 15 percent as too high an excess of oxygen may cause the reaction to turn into brisk burning, accompanied by flames.

The advantage of the carbonaceous additions is that they will give to the smoke which is generated a more or less grey coloring; above all, they will make the smoke heavier and colder thereby improving its adhesion to the ground. Moreover, these mixtures can easily be formed into tablets, lentils or pellets to facilitate quantitative adjustment as well as into blocks, cylinders, and the like which may be set up as smoke candles or smoke pots. Such forming is effected without the addition of binding agents and at low pressures.

The larger sizes of articles formed by compression and in accordance with the present invention, such as cylinders and briquets weighing from one kilogram to 20 kilograms should preferably be placed in cases with a wall thickness of about one to two millimeters to avoid abrasion during storage and transport; such cases may be made of sheet metal, plastics, or cardboard, and may also serve as containers for the smoke agent during the actual process of smoke generation. For this purpose, openings are provided in accordance with the present invention in the walls of the cases. Smoke generated during the process will escape through these openings so that smoke generation will be uniform and continuous, thus precluding a bursting of the case due to a gas pressure build-up inside the case. During the smoke generation process, considerable quantities of gas are formed with a concurrent generation of heat, and the material puffs up.

Due to the fact that the smoke agent mixture according to the present invention does not ignite spontaneously and is insensitive to moisture, the gas escape openings in the walls of the containers may be as large as is compatible with the requirement for stability of the containers; the latter may for instance be made of wire mesh or perforated sheet metal in which case the mixture is suitably enclosed in a bag of thin plastic foil to prevent it from running out when subjected to shocks or the like; another possibility would be to insert degassing tubes which would run through the entire length of the material. The plastic foil is suitably made of materials which will smolder, such as gelatine or plastic polymers, to avoid the formation of flames. The degassing tubes are suitably made of perforated cardboard or a plastic material which will smolder rather than burn.

Owing to non-toxicity, good adhesion to the ground, and great density of the smoke generated by the smoke agent mixtures according to the present invention, these are also particularly suited for employment in agriculture and forestry where the possibility of maintaining a dense smoke screen over extended periods of time is above all important; the smoke is also a specially suitable carrier for pest control agents, either those added to the smoke as gaseous respiratory system poisons, for instance in the form of a basic substance which will release toxic vapors at high temperatures, such as compounds which will form sulphur dioxide, or those added by spraying, and other suitable methods. Thus it is possible for instance to substitute for part of the mineral oils employed such substances as carbolineum, liquid solutions of hexachlor-cyclohexane, carbon tetrachloride, xylene, or the like. Compared to dusted coatings and the like, dense inert smokes offer the advantage of prolonging the time during which the agent may act due to their prolonged adhesion to the ground.

What is claimed is:

1. A smoke generating composition comprising:
   (a) red phosphorus;

(b) an oxidizing agent in an amount at least sufficient to oxidize said phosphorus;
(c) an ammonium salt vaporizable by the heat of oxidation of said phosphorus by said oxidizing agent; and
(d) between 4 and 12 percent by weight of a hydrocarbon having a boiling point substantially between 200° C. and 380° C.

2. A composition as set forth in claim 1, wherein said hydrocarbon is present in an amount between 7 and 9 percent.

References Cited by the Examiner
UNITED STATES PATENTS

| | | | |
|---|---|---|---|
| 1,750,101 | 3/30 | Goss | 102—39 |
| 1,785,744 | 12/30 | Oglesby | 252—305 |
| 2,389,552 | 11/45 | Sanford | 149—29 X |
| 2,633,444 | 3/53 | Marke | 102—39 X |
| 2,658,874 | 11/53 | Clay | 149—29 X |
| 2,995,526 | 8/61 | De Ment | 252—305 |

CARL D. QUARFORTH, *Primary Examiner.*

LEON D. ROSDOL, *Examiner.*